(12) United States Patent
Koga et al.

(10) Patent No.: US 10,650,968 B2
(45) Date of Patent: May 12, 2020

(54) MULTILAYER CERAMIC CAPACITOR

(71) Applicant: Murata Manufacturing Co., Ltd., Nagaokakyo-shi, Kyoto-fu (JP)

(72) Inventors: Takeshi Koga, Nagaokakyo (JP); Teppei Akiyoshi, Nagaokakyo (JP); Masayuki Ishihara, Nagaokakyo (JP); Katsuhiko Hara, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 12 days.

(21) Appl. No.: 16/225,402

(22) Filed: Dec. 19, 2018

(65) Prior Publication Data
US 2019/0189346 A1    Jun. 20, 2019

(30) Foreign Application Priority Data
Dec. 20, 2017    (JP) .................. 2017-244540

(51) Int. Cl.
| | |
|---|---|
| *H01G 4/30* | (2006.01) |
| *H01G 4/12* | (2006.01) |
| *C04B 35/468* | (2006.01) |
| *H01B 3/12* | (2006.01) |
| *C04B 35/49* | (2006.01) |
| *C04B 35/47* | (2006.01) |
| *C04B 35/486* | (2006.01) |

(52) U.S. Cl.
CPC ......... *H01G 4/1236* (2013.01); *C04B 35/468* (2013.01); *C04B 35/4682* (2013.01); *C04B 35/47* (2013.01); *C04B 35/486* (2013.01); *C04B 35/49* (2013.01); *H01B 3/12* (2013.01); *H01G 4/30* (2013.01); *C04B 2235/3208* (2013.01); *C04B 2235/3215* (2013.01); *C04B 2235/3262* (2013.01); *C04B 2235/768* (2013.01)

(58) Field of Classification Search
CPC .......... H01G 4/005; H01G 4/08; H01G 4/012; H01G 4/30; H01G 4/232; H01G 4/248; H01G 4/1227; H01G 4/252; H01G 4/1236; C04B 35/486; C04B 2235/3208; C04B 2235/6584
See application file for complete search history.

(56) References Cited

U.S. PATENT DOCUMENTS

| | | | | |
|---|---|---|---|---|
| 2008/0242532 | A1* | 10/2008 | Nishikawa | ........... C04B 35/4682 501/138 |
| 2013/0222971 | A1* | 8/2013 | Nishimura | ............ C04B 35/486 361/301.4 |
| 2015/0287535 | A1* | 10/2015 | Nakanishi | ................. H01G 4/30 361/301.4 |
| 2016/0049255 | A1* | 2/2016 | Sugita | ...................... H01G 4/30 361/301.4 |

(Continued)

FOREIGN PATENT DOCUMENTS

JP    10-335169 A    12/1998

*Primary Examiner* — Nguyen T Ha
(74) *Attorney, Agent, or Firm* — Keating & Bennett, LLP (57) ABSTRACT

A multilayer ceramic capacitor includes dielectric layers and internal electrode layers provided on the dielectric layers. The dielectric layers each include a perovskite compound that includes Ca and Zr, and optionally Sr and Ti. Mn is disposed at an interface between one of the dielectric layers and one of the internal electrode layers, and a Mn/Zr molar ratio at the interface is not less than about 0.117.

20 Claims, 3 Drawing Sheets

(56) References Cited

U.S. PATENT DOCUMENTS

2016/0049256 A1* 2/2016 Kitano ................... H01G 4/012
  361/301.4
2016/0071649 A1* 3/2016 Okamoto ................ C04B 35/49
  361/301.4

* cited by examiner

MULTILAYER CERAMIC CAPACITOR

CROSS REFERENCE TO RELATED APPLICATIONS

This application claims the benefit of priority to Japanese Patent Application No. 2017-244540 filed on Dec. 20, 2017. The entire contents of this application are hereby incorporated herein by reference.

BACKGROUND OF THE INVENTION

1. Field of the Invention

The present invention relates to a multilayer ceramic capacitor including a laminate, that includes a plurality of stacked dielectric layers and a plurality of stacked internal electrode layers, and an external electrode provided on an end surface of the laminate so as to be electrically connected to the internal electrode layers.

2. Description of the Related Art

In general, $CaZrO_3$-based compounds are widely used for multilayer ceramic capacitors for temperature compensation and the like, since the temperature change rate of electrostatic capacitance is small and the dielectric loss (tan δ) is small.

As a dielectric ceramic material used for a dielectric layer, for example, the non-reducing dielectric ceramic material (multilayer ceramic capacitor) disclosed in Japanese Patent Application Laid-Open No. H10-335169 includes a main component and auxiliary components, wherein when the main component is represented by the following formula: $[(Ca_XSr_{1-X})O]_m[(Ti_YZr_{1-Y})O_2]$, X, Y and m are in the following ranges: $0 \leq X \leq 1$, $0 \leq Y \leq 0.10$, and $0.7 \leq m \leq 1.04$ and the auxiliary components consist of 0.2 to 5 mol % per the main component of Mn oxide calculated as MnO, 0.1 to 10 mol % per the main component of Al oxide calculated as $Al_2O_3$, and 0.5 to 15 mol % per the main component of a component represented by the following formula: $[(Ba_ZCa_{1-Z})O]_VSiO_2$ in which Z and V are in the following ranges: $0 \leq Z \leq 1$, and $0.5 \leq V \leq 4.0$ (see Japanese Patent Application Laid-Open No. H10-335169).

However, in the multilayer ceramic capacitor containing the dielectric ceramic mainly composed of Ca, Sr, and Zr as described in Japanese Patent Application Laid-Open No. H10-335169, as compared with a multilayer ceramic capacitor containing $BaTiO_3$ dielectric ceramic, it has been known that peeling failure at the interface between an internal electrode layer and a dielectric layer tends to occur in a moisture resistance load test or the like.

SUMMARY OF THE INVENTION

Preferred embodiments of the present invention provide multilayer ceramic capacitors each including dielectric ceramic mainly composed of Ca, Sr, and Zr, and in each of the multilayer ceramic capacitors, structural defects due to peeling occurring at the interface between the internal electrode layer and the dielectric layer are reduced or prevented.

A multilayer ceramic capacitor according to a preferred embodiment of the present invention includes a laminate including a first main surface and a second main surface facing each other in a stacking direction, a first side surface and a second side surface facing each other in a width direction orthogonal or substantially orthogonal to the stacking direction, and a first end surface and a second end surface facing each other in a length direction orthogonal or substantially orthogonal to the stacking direction and the width direction, and an external electrode disposed on one of the first and second end surfaces. In this multilayer ceramic capacitor, the laminate includes a plurality of dielectric layers and a plurality of internal electrode layers provided on the plurality of dielectric layers, in other words, the laminate in which a plurality of dielectric layers and a plurality of internal electrode layers are alternately laminated, the plurality of dielectric layers include a perovskite compound including Ca and Zr and optionally Sr and Ti, Mn is present at the interface between the dielectric layer and the internal electrode layer, and a Mn/Zr molar ratio is not less than about 0.117 at the interface.

In a multilayer ceramic capacitor according to a preferred embodiment of the present invention, at the interface between the dielectric layer and the internal electrode layer, Mn is present in a predetermined ratio relative to the main raw material of a dielectric material. As a result, Mn whose valence may change is disposed at the interface, and an oxygen ion is shared with internal electrode metal, so that strong interfacial bonding via the oxygen atom is able to be obtained between the dielectric layer as an oxide and the internal electrode layer as a metal.

In a multilayer ceramic capacitor according to a preferred embodiment of the present invention, the Mn/Zr molar ratio is not more than about 0.027 in the dielectric layer of a portion about 20 nm inside from the interface between the internal electrode layer and the dielectric layer toward the dielectric layer.

In a multilayer ceramic capacitor according to a preferred embodiment of the present invention, a capacitance change rate at the temperature of dielectric characteristics required for the multilayer ceramic capacitor is not more than about 30 ppm/° C., and an adhesion force between the dielectric layer and the internal electrode layer is able to be improved while the dielectric characteristics due to the temperature are maintained.

In a multilayer ceramic capacitor according to a preferred embodiment of the present invention, the internal electrode layer is Ni or Cu.

In a multilayer ceramic capacitor according to a preferred embodiment of the present invention, the dielectric layer is mainly composed of $CaZrO_3$.

With the multilayer ceramic capacitors according to preferred embodiments of the present invention, it is possible to secure the adhesion force between the dielectric layer and the internal electrode layer, and as a result, structural defects due to peeling occurring at the interface between the dielectric layer and the internal electrode layer are able to be reduced or prevented.

The above and other elements, features, steps, characteristics and advantages of the present invention will become more apparent from the following detailed description of the preferred embodiments with reference to the attached drawings.

BRIEF DESCRIPTION OF THE DRAWINGS

FIGS. 4A to 4C are cross-sectional views taken along line II-II of the multilayer ceramic capacitor shown in FIG. 1 and each showing a preferred embodiment of a floating internal electrode layer which is a modification of an internal electrode layer, in which FIG. 4A shows a structure in which two counter electrode portions are continuously provided, FIG. 4B shows a structure in which three counter electrode portions are continuously provided, and FIG. 4C shows a structure in which four counter electrode portions are continuously provided.

DETAILED DESCRIPTION OF THE PREFERRED EMBODIMENTS

Preferred embodiments of the present invention will be described with reference to the accompanying drawings.

Figure 1:
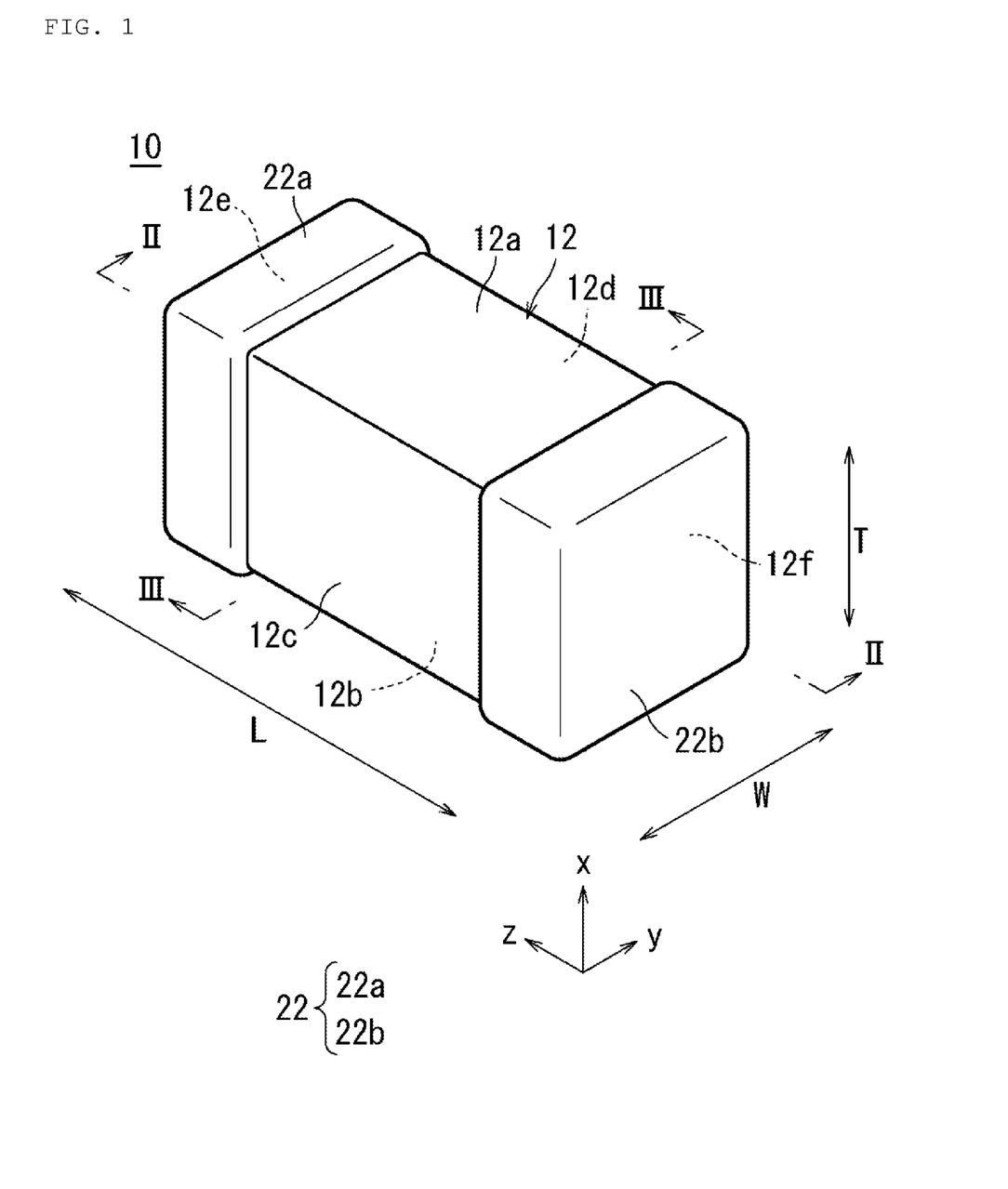
FIG. 1 is a perspective view showing an example of a multilayer ceramic capacitor according to a preferred embodiment of present invention.
Figure 2:
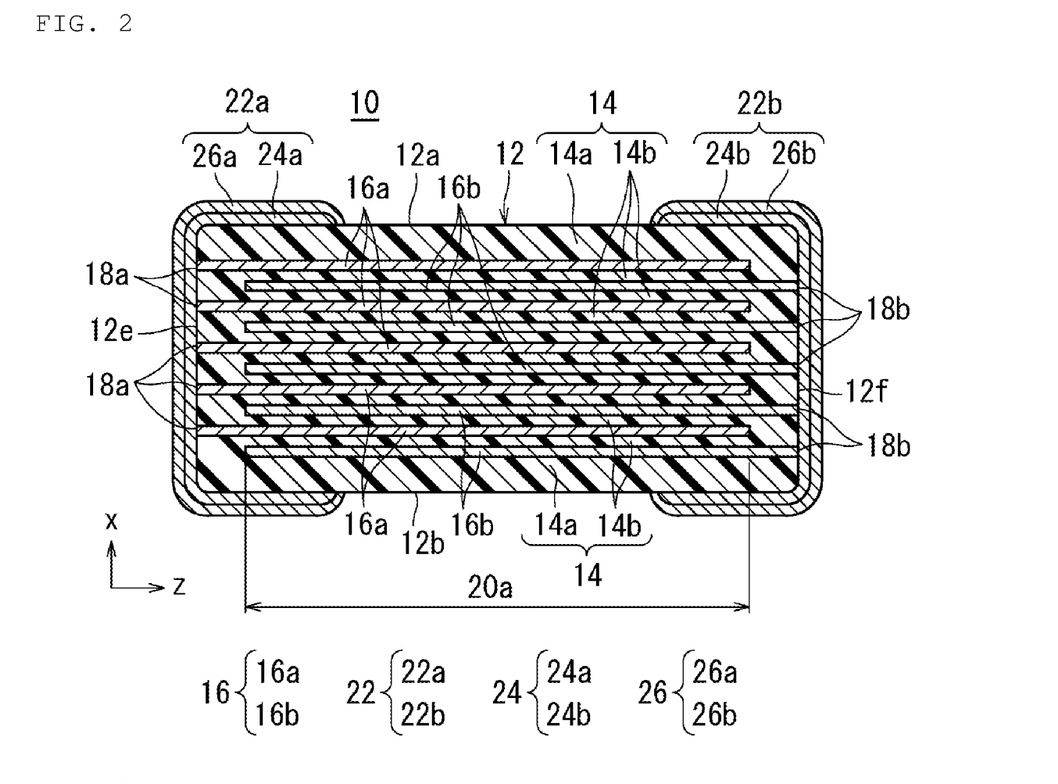
FIG. 2 is a cross-sectional view taken along line II-II of the multilayer ceramic capacitor shown in FIG. 1.
Figure 3:
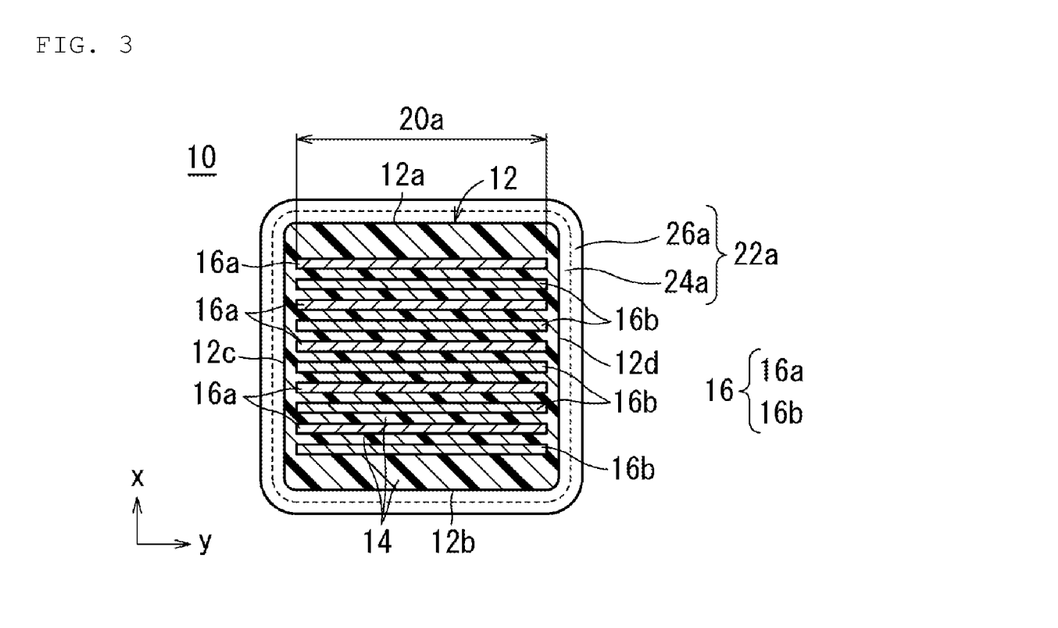
FIG. 3 is a cross-sectional view taken along line III-III of the multilayer ceramic capacitor shown in FIG. 1.

As shown in FIGS. 1, 2, and 3, a multilayer ceramic capacitor 10 according to a preferred embodiment of the present invention includes, for example, a laminate 12 having a rectangular or substantially rectangular parallelepiped shape. The laminate 12 includes a plurality of stacked dielectric layers 14 and a plurality of stacked internal electrode layers 16. The laminate 12 further includes a first main surface 12a and a second main surface 12b facing each other in a stacking direction x, a first side surface 12c and a second side surface 12d facing each other in a width direction y orthogonal or substantially orthogonal to the stacking direction x, and a first end surface 12e and a second end surface 12f facing each other in a length direction z orthogonal or substantially orthogonal to the stacking direction x and the width direction y. It is preferable that the laminate 12 is rounded at the corner portions and the ridge line portions. The corner portions are portions at which three adjacent surfaces of the laminate intersect, and the ridge line portions are portions at which two adjacent surfaces of the laminate intersect.

Mn is present at the interface between the dielectric layer 14 and the internal electrode layer 16 in the laminate 12, and as the content ratio, a Mn/Zr molar ratio is preferably not less than about 0.117, for example. That is, at the interface between the dielectric layer 14 and the internal electrode layer 16, Mn is present in a predetermined ratio relative to the main raw material of a dielectric material. As a result, Mn whose valence may change is disposed at the interface, and an oxygen ion is shared with internal electrode metal, so that strong interfacial bonding via the oxygen atom is able to be obtained between the dielectric layer 14 as an oxide and the internal electrode layer 16 as a metal. Thus, it is possible to secure an adhesion force between the dielectric layer 14 and the internal electrode layer 16, and as a result, structural defects due to peeling occurring at the interface between the dielectric layer 14 and the internal electrode layer 16 are able to be reduced or prevented. On the other hand, when the Mn/Zr molar ratio is smaller than about 0.117, peeling or other structural defects are likely to occur between the dielectric layer 14 and the internal electrode layer 16.

It is preferable that the Mn/Zr molar ratio which is the content ratio of Mn is, for example, not more than about 0.027 at a portion about 20 nm inside from the interface between the dielectric layer 14 and the internal electrode layer 16 toward the dielectric layer 14. Consequently, a capacitance change rate at the temperature of dielectric characteristics required for the multilayer ceramic capacitor 10 is not more than about 30 ppm/° C., for example, and it is possible to obtain the effect of ensuring an adhesion force between the dielectric layer 14 and the internal electrode layer 16 while maintaining the dielectric characteristics due to the temperature. On the other hand, if Mn/Zr is more than about 0.027, the temperature characteristics of COG under EIA standard cannot be satisfied. However, the use is allowed when a multilayer ceramic capacitor having a larger capacitance change rate than the COG characteristics is allowed. In preferred embodiments of the present invention, the use with the temperature characteristics of the most severe condition is assumed.

As a method of analyzing the Mn/Zr molar ratio, a sample at an arbitrary position is sliced, and when a portion at which the dielectric layer 14 and the internal electrode layer 16 are in contact with each other defines an interface, composition analysis of the interface portion is performed using a field emission type transmission electron microscope (hereinafter referred to as "FE-TEM") by an energy dispersive X-ray spectroscopy (hereinafter referred to as "EDX"). Since a quantitative value of each element is able to be found by EDX analysis, comparative analysis is able to be performed by defining the quantitative value of each element by Zr.

Although the method of achieving the arrangement of Mn at the interface between the dielectric layer 14 and the internal electrode layer 16 may be a method of controlling the atmosphere during firing, in the present preferred embodiment, Mn is added to the internal electrode layer 16, so that a structure including the features of the present invention is achieved. Specifically, it is controlled preferably by adding Mn resinate to an internal electrode material in an amount of not less than about 0.01% and less than about 0.5%, for example.

Mn is not present alone in the dielectric layer 14 and the internal electrode layer 16 but is present via an oxygen ion by sharing the oxygen ion with the internal electrode metal between the dielectric layer 14 as an oxide and the internal electrode layer 16 as a metal.

The detailed structures of the dielectric layer 14 and the internal electrode layer 16 are described below.

As the dielectric materials of the dielectric layer 14, it is possible to use, for example, a dielectric ceramic including a perovskite compound that includes Ca and Zr, and optionally Sr and Ti, and including components, such as $CaZrO_3$, $CaTiO_3$, $SrTiO_3$, and $BaZrO_3$. Among them, $CaZrO_3$ (calcium zirconate), for example, is preferably used as a main component. Usually, the multilayer ceramic capacitor 10 is fired in a reducing atmosphere to generate oxygen vacancies. However, since $CaZrO_3$ has a high band gap, the generation of oxygen vacancies is able to be reduced or prevented. As a result, high reliability is able to be obtained. Further, it is also possible to use those obtained with the addition of a component that is lower in content than the main component, for example, a Mn compound, a Fe compound, a Cr compound, a Co compound, a Ni compound or other suitable compound to these components.

More specifically, the dielectric layer 14 preferably includes, for example, a perovskite compound including Ca and Zr, and optionally Sr and Ti. The perovskite compound is represented by the general formula $A_mBO_3$. Here, although the A site is preferably mainly Ca, for example, in addition to Ca, the A site may include at least one selected from the group consisting of Sr and Ba. Although the B site is preferably mainly Zr, for example, the B site may include Ti in addition to Zr. O is oxygen. m represents the molar ratio between the A site and the B site.

In this case, for example, as each content, mol % of Ca is provided by (the number of moles of Ca)/(the number of moles of Sr+the number of moles of Ba+the number of moles of Ca) and is not less than about 50% and not more than about 100%, mol % of Ba is provided by (the number of moles of Ba)/(the number of moles of Sr+the number of moles of Ba+the number of moles of Ca) and is not less than about 0% and not more than about 40%, mol % of Sr is provided by (the number of moles of Sr)/(the number of moles of Sr+the number of moles of Ba+the number of moles of Ca) and is not less than about 0% and not more than about 45%, mol % of Zr is provided by (the number of moles of Zr)/(the number of moles of Zr+the number of moles of Ti) and is not less than about 80% and not more than about 100%, mol % of Ti is provided by (the number of moles of Ti)/(the number of moles of Zr+the number of moles of Ti) and is not less than about 0% and not more than about 20%, and (the number of moles of Ca+the number of moles of Sr+the number of moles of Ba)/(the number of moles of Zr+the number of moles of Ti) is preferably not less than about 1.00 and not more than about 1.03. Consequently, the multilayer ceramic capacitor 10 having high temperature characteristics and high reliability is able to be obtained.

Although the thickness of the dielectric layer 14 is not particularly limited, it is preferably not less than about 0.5 μm and not more than about 30 μm, for example. Although the number of the dielectric layers 14 is not particularly limited, it is preferably not less than about 10 and not more than about 400, for example. The dimension of the dielectric layer 14 in the stacking direction x is preferably not less than about 200 μm and not more than about 2700 μm, for example.

As shown in FIG. 2, the dielectric layer 14 includes an outer layer portion 14a and an inner layer portion 14b. The outer layer portion 14a is located on one of the first main surface 12a side and the second main surface 12b side of the laminate 12 and is one of the dielectric layer 14 located between the first main surface 12a and the internal electrode layer 16 closest to the first main surface 12a and the dielectric layer 14 located between the second main surface 12b and the internal electrode layer 16 closest to the second main surface 12b. A region sandwiched between both outer layer portions 14a is the inner layer portion 14b. The dimension (thickness) in the stacking direction x of the outer layer portion 14a is preferably not less than about 5% and not more than about 45%, for example, of the dimension of thickness T in the stacking direction x of the laminate 12. For example, when the dimension of a length L in the length direction z of the laminate 12 is about 3.2 mm, the dimension of a width W in the width direction y of the laminate 12 is about 1.6 mm, and the dimension of the thickness T in the stacking direction x of the laminate 12 is about 0.2 mm, the thickness in the stacking direction x of the outer layer portion 14a is preferably in the range of, for example, not less than about 10 μm and not more than about 90 μm.

Although each dimension of the laminate 12 is not particularly limited, for example, preferably, the length L in the length direction z is not less than about 0.2 mm and not more than about 32 mm, the width W in the width direction y is not less than about 0.1 mm and not more than about 32 mm, and the thickness T in the stacking direction x is not less than about 0.1 mm and not more than about 5 mm. The dimensions of the laminate 12 may be measured with a micrometer or an optical microscope.

As shown in FIGS. 2 and 3, the laminate 12 includes the plurality of stacked internal electrode layers 16, and the internal electrode layers 16 include a plurality of first internal electrode layers 16a and a plurality of second internal electrode layers 16b. The first internal electrode layers 16a and the second internal electrode layers 16b are sandwiched between the dielectric layers 14 and alternately stacked in the stacking direction x.

The first internal electrode layer 16a includes a counter electrode portion 20a facing the second internal electrode layer 16b and an extended electrode portion 18a led out from the counter electrode portion 20a to the first end surface 12e of the laminate 12.

An end portion of the extended electrode portion 18a of the first internal electrode layer 16a is led out to the surface of the first end surface 12e of the laminate 12 to define an exposure portion.

The second internal electrode layer 16b includes the counter electrode portion 20a facing the first internal electrode layer 16a and an extended electrode portion 18b led out from the counter electrode portion 20a to the second end surface 12f of the laminate 12.

An end portion of the extended electrode portion 18b of the second internal electrode layer 16b is led out to the surface of the second end surface 12f of the laminate 12 to define an exposure portion.

The first and second internal electrode layers 16a and 16b may be made of a suitable conductive material, such as a metal such as Ni, Cu, Ag, Pd, or Au, or an alloy including at least one of these metals (for example, Ag—Pd alloy).

In the present preferred embodiment, the counter electrode portions 20a of the internal electrode layer 16 face each other with the dielectric layer 14 interposed therebetween to provide electrostatic capacitance, and the characteristics of the capacitor are developed.

The thickness of the first and second internal electrode layers 16a and 16b is preferably not less than about 0.5 μm and not more than about 2.0 μm, for example.

As shown in FIGS. 1 and 2, external electrodes 22 that cover the end surfaces 12e and 12f are provided on the first end surface 12e side and the second end surface 12f side of the laminate 12. The external electrode 22 includes a first external electrode 22a connected on the first end surface 12e of the laminate 12 and a second external electrode 22b connected on the second end surface 12f of the laminate 12.

The first external electrode 22a covers the first end surface 12e of the laminate 12 and is connected to the first internal electrode layer 16a. Specifically, it is preferable that the first external electrode 22a extends to a portion of the first and second main surfaces 12a and 12b and a portion of the first and second side surfaces 12c and 12d. However, the first external electrode 22a may be disposed only on the first end surface 12e.

The second external electrode 22b covers the second end surface 12f of the laminate 12 and is connected to the second internal electrode layer 16b. Specifically, it is preferable that the second external electrode 22b extends to a portion of the first and second main surfaces 12a and 12b and a portion of the first and second side surfaces 12c and 12d. However, the second external electrode 22b may be disposed only on the second end surface 12f.

Each of the first and second external electrodes 22a and 22b includes an underlying electrode layer 24 (24a, 24b) and a plating layer 26 (26a, 26b) disposed on the underlying electrode layer 24 (24a, 24b).

The underlying electrode layer 24 (24a, 24b) includes at least one selected from a baking layer, a resin layer, a thin film layer, and other suitable layer, for example.

The underlying electrode layer 24 includes a first underlying electrode layer 24a and a second underlying electrode layer 24b.

The first underlying electrode layer 24a covers the first end surface 12e of the laminate 12 and is connected to the first internal electrode layer 16a. Specifically, it is preferable that the first underlying electrode layer 24a extends to a portion of the first and second main surfaces 12a and 12b and a portion of the first and second side surfaces 12c and 12d. However, the first underlying electrode layer 24a may be disposed only on the first end surface 12e.

The second underlying electrode layer 24b covers the second end surface 12f of the laminate 12 and is connected to the second internal electrode layer 16b. Specifically, it is preferable that the second underlying electrode layer 24b extends to a portion of the first and second main surfaces 12a and 12b and a portion of the first and second side surfaces 12c and 12d. However, the second underlying electrode layer 24b may be disposed only on the second end surface 12f.

Although the first underlying electrode layer 24a and the second underlying electrode layer 24b (hereinafter also simply referred to as the underlying electrode layer) each include at least one selected from a baking layer, a thin film layer and other suitable layer, in the present preferred embodiment, the first underlying electrode layer 24a and the second underlying electrode layer 24b defined by the baking layer will be described. The baking layer preferably includes glass and metal, for example. The glass preferably includes at least one selected from B, Si, Ba, Mg, Al, Li and other suitable material, for example.

As the metal of the baking layer, the baking layer preferably includes, for example, at least one selected from Cu, Ni, Ag, Pd, Ag—Pd alloy, Au and other suitable material.

The baking layer may include a plurality of layers.

The baking layer is formed by applying a conductive paste including glass and metal onto the laminate 12 and baking the conductive paste, and the baking layer may be formed by being fired simultaneously with the internal electrode layer 16 or may be baked after the internal electrode layer 16 is fired.

The thickness of the thickest portion of the baking layer is preferably not less than about 10 μm and not more than about 50 μm, for example.

A resin layer including conductive particles and a thermosetting resin may be provided on the surface of the baking layer. The resin layer may be disposed directly on the laminate 12 without including the baking layer. The resin layer preferably includes, for example, conductive particles and a thermosetting resin. When the resin layer is provided, the resin layer may be disposed directly on the laminate 12 without including the baking layer.

The resin layer may be disposed on the surface of the baking layer or directly on the surface of the first end surface 12e or the second end surface 12f without including the baking layer.

The resin layer may include a plurality of layers.

The thickness of the thickest portion of the resin layer is preferably not less than about 10 μm and not more than about 150 μm, for example.

When the first underlying electrode layer 24a and the second underlying electrode layer 24b are each a thin film layer, the thin film layer is preferably formed by a thin film forming method, such as a sputtering method or a vapor deposition method, for example, and is preferably not more than about 1 μm, for example, in which metal grains are deposited.

The plating layers 26a and 26b preferably includes, for example, at least one metal or alloy selected from Cu, Ni, Ag, Pd, Ag—Pd alloy, Au and other suitable material.

The plating layers 26a and 26b may include a plurality of layers. A preferred structure is a two-layer structure including a Ni plating layer and a Sn plating layer, for example. The Ni plating layer prevents the underlying electrode layer 24 from being eroded by solder when a ceramic electronic component is mounted, and the Sn plating layer improves wettability of solder when a ceramic electronic component is mounted to facilitate the mounting.

The thickness per layer of the plating layers 26a and 26b is preferably not less than about 1 μm and not more than about 15 μm, for example.

Hereinafter, a structure in which the plating layers 26a and 26b are provided without providing the underlying electrode layer 24 will be described.

In each of the first external electrode 22a and the second external electrode 22b, the underlying electrode layer 24 may not be provided, and the plating layers 26a and 26b may be provided directly on the surface of the laminate 12. That is, the multilayer ceramic capacitor 10 may have a structure including the plating layers 26a and 26b electrically connected to the first internal electrode layer 16a or the second internal electrode layer 16b.

In such a case, the plating layers 26a and 26b may be formed after a catalyst is disposed on the surface of the laminate 12 as a pretreatment.

The plating layers 26a and 26b preferably include lower plating electrodes 26a1 and 26b1 provided on the surface of the laminate 12 and upper plating electrodes 26a2 and 26b2 provided on the surfaces of the lower plating electrodes 26a1 and 26b1.

The lower plating electrodes 26a1 and 26b1 and the upper plating electrodes 26a2 and 26b2 preferably each include, for example, at least one metal selected from Cu, Ni, Sn, Pb, Au, Ag, Pd, Bi, Zn and other suitable material or an alloy including the selected metals.

For example, the lower plating electrodes 26a1 and 26b1 are preferably made of Ni having solder barrier performance, and the upper plating electrodes 26a2 and 26b2 are preferably made of Sn or Au with good solder wettability.

For example, when the first and second internal electrode layers 16a and 16b are made of Ni, the lower plating electrodes 26a1 and 26b1 are preferably made of Cu having good joinability with Ni. The upper plating electrodes 26a2 and 26b2 may be included as needed, and the first and second external electrodes 22a and 22b may be defined only of the lower plating electrodes 26a1 and 26b1, respectively.

In the plating layers 26a and 26b, the upper plating electrodes 26a2 and 26b2 may be the outermost layers, or other plating electrodes may be further provided on the surfaces of the upper plating electrodes 26a2 and 26b2.

The thickness per layer of the plating layers 26a and 26b is preferably not less than about 1 μm and not more than about 15 μm, for example.

It is preferable that the plating layers 26a and 26b do not include glass. It is preferable that a metal proportion per unit volume in the plating layers 26a and 26b is not less than about 99% by volume, for example.

The dimension L in the length direction z including the laminate 12 and the first and second external electrodes 22a and 22b is preferably not less than about 0.2 mm and not more than about 5.7 mm, for example.

The dimension T in the stacking direction x including the laminate 12 and the first and second external electrodes 22a and 22b is preferably not less than about 0.1 mm and not more than about 2.7 mm, for example.

The dimension W in the width direction y including the laminate 12 and the first and second external electrodes 22a and 22b is preferably not less than about 0.1 mm and not more than about 5.0 mm, for example.

The interface between metal, which is solidified by bonding positive ions by metallic bonding that may occur via free electrons moving freely between the positive ions, and oxide porcelain solidified by bonding positive ions and negative ions by an ionic bond by electrostatic attractive force generally does not bond, or even if the interface bonds, the bond is unstable. As a stable bonding interface between the metal and the oxide porcelain, an oxide film is provided on the surface of a metal simple substance. This oxide film is formed by coupling positive ions exposed on the metal surface with oxygen or water vapor in the atmosphere.

In the firing of a multilayer ceramic capacitor including Ni or other suitable material as an internal electrode, when the internal electrode metal is disposed in an oxidizing atmosphere for a long time at high temperature, the internal electrode metal is oxidized to diffuse and disappear in the oxide porcelain and, thus, to lose its function, so that such a multilayer ceramic capacitor is typically fired at an oxygen partial pressure not more than the oxidation-reduction equilibrium oxygen partial pressure.

At this time, when the valences in which the element in the oxide porcelain may have are constant, sintering of the oxide porcelain together with the oxygen of the number substantially corresponding to the valences is completed, and it is difficult for air and oxygen to enter the interface between the oxide porcelain sintered without forming gaps after cooling and the internal electrode metal.

As a result, the internal electrode metal including almost no oxide film on the surface, in other words, the internal electrode metal not including a bond with an oxygen ion, and the oxide porcelain form an interface, so that the junction at the contact interface tends to be destroyed by various stresses, and structural defect failures have occurred in the manufacturing process after firing.

Even if oxygen is supplied during a temperature lowering process, only a NiO layer is formed between the metal and the oxide porcelain that defines and functions as a dielectric, and a stable bonding interface is not necessarily always obtained.

On the other hand, Mn elements which may have various valences are disposed at an interface at an atomic level between an internal electrode and the oxide porcelain at a high concentration in comparison with that in the oxide porcelain, so that even if firing is performed in the atmosphere reducing the internal electrode metal at a high sintering temperature, Mn lowers the valence of the oxygen ion bonded to the oxide porcelain under the temperature at which the internal electrode metal forms an oxide film and an oxygen partial pressure environment, so that the oxygen ion is able to be shared with the internal electrode metal, and a strong bonding interface via an oxygen ion is able to be obtained.

Even if a small amount of the Mn element is added into the oxide porcelain, in particular, $CaZrO_3$ or $(CaSr)ZrO_3$, for example, cannot provide sufficient stability at the bonding interface, or when a large amount of the Mn element is added in order to obtain a stable bonding interface, the characteristics of the oxide porcelain are changed, and there is a problem that sufficient performance cannot be achieved by a multilayer ceramic capacitor. However, according to preferred embodiments of the present invention, it is possible to achieve both a stable bonding interface and desired electrical characteristics.

As a result, structural defects due to peeling occurring at the interface between the dielectric layer 14 and the internal electrode layer 16 are able to be reduced or prevented.

Next, a non-limiting example of a method of manufacturing the multilayer ceramic capacitor 10 according to a preferred embodiment of the present invention will be described.

Initially, as raw materials defining the main component of the dielectric layer, for example, $CaCO_3$ (calcium carbonate), $SrCO_3$ (strontium carbonate), $BaCO_3$ (barium carbonate), $TiO_2$ (titanium oxide), and $ZrO_2$ (zirconium oxide) powders which are raw material powders and have a purity of not less than about 99% are preferably provided. These powders are weighed so as to achieve a predetermined composition and then wet-mixed using a ball mill or other suitable device. Thereafter, the resultant mixture is dried and disintegrated. The powder obtained by disintegration is calcined in the atmosphere at a temperature of, for example, not less than about 900° C. and not more than about 1400° C., for example, for about 2 hours. The calcined powder is disintegrated again to obtain a main component raw material powder.

Subsequently, as raw materials defining auxiliary components, for example, $SiO_2$ (silicon dioxide), $MnCO_3$ (manganese carbonate), and $Al_2O_3$ (aluminum oxide) powders are preferably provided. The above-described main component raw material powder and these auxiliary component raw material powders are weighed such that the auxiliary component raw material powders have a predetermined blending ratio with respect to the main component raw material powder, and then wet-mixed using a ball mill or other suitable device. Thereafter, the resultant mixture is dried and disintegrated to obtain a raw material powder.

Then, to 100 parts by weight of the obtained raw material powder, for example, a polyvinyl butyral type binder and an organic solvent, such as toluene or ethanol, are preferably added and wet-mixed using a ball mill to prepare a ceramic slurry.

The ceramic green sheet thus obtained and a conductive paste for the internal electrode layer 16 are provided. Although the ceramic green sheet and a Ni conductive paste for the internal electrode layer 16 may include a binder and a solvent, known organic binder and organic solvent may be used.

In the present preferred embodiment, as the conductive paste, for example, a paste including about 100 parts by weight of Ni powder as a metallic powder, about 7 parts by weight of ethyl cellulose as an organic vehicle, and terpineol as a solvent is preferably used. When each material is kneaded/dispersed, Mn resinate is added in an amount of not less than about 0.01% and less than about 0.5%, for example, at the weight ratio of Mn in the Mn resinate to the weight of the metallic powder, thus producing the conductive paste for the internal electrode layer 16. In the present preferred embodiment, a target Mn/Zr molar ratio is achieved by adding not less than about 0.01% and less than about 0.5%, for example, of the Mn resinate at the weight ratio of Mn in the Mn resinate to the metallic powder of the internal electrode layer 16.

Then, on the ceramic green sheet, the conductive paste for the internal electrode layer 16 is printed in a predetermined pattern, for example, by screen printing, gravure printing or other suitable method. Consequently, a conductive paste layer for the internal electrode layer 16 is formed on the ceramic green sheet, and an internal electrode pattern is formed.

Thereafter, electrode sheets, which are each a ceramic green sheet on which the conductive paste layer for the internal electrode layer 16 is formed, are stacked such that ends from which the conductive paste layer for the internal electrode layer 16 is led out are alternately reversed, and an outer layer sheet which is a plain ceramic green sheet on which the conductive paste layer for the internal electrode layer 16 is not vertically stacked is stacked to form the outer layer portion 14a. That is, a predetermined number of ceramic green sheets for the outer layer portion 14a on which the internal electrode pattern is not formed are stacked, a ceramic green sheet on which the internal electrode pattern is formed is sequentially stacked thereon, and a predetermined number of the ceramic green sheets for the outer layer portion 14a are stacked thereon, thus producing a laminate sheet. At this time, a plurality of ceramic green sheets on which the internal electrode pattern is formed are stacked such that the sides on which the internal electrode patterns are led out are staggered.

Then, the obtained laminate sheet is pressed in the stacking direction by, for example, an isostatic press or other suitable press to produce a laminate block.

Then, the laminate block is cut to a predetermined size, and laminate chips are cut out. At this time, the laminate block may be rounded at the corner portions of the laminate chip and the ridge line portions by barrel polishing or other suitable method.

The laminate chip is heated to a temperature of, for example, not less than about 150° C. and not more than about 900° C. in the atmosphere to burn the binder, then the temperature is raised at a temperature rise of, for example, not less than about 3.33° C./min, and the laminate chip is fired in a reducing atmosphere such that the maximum temperature is not less than about 1100° C. and not more than about 1350° C., for example.

According to the above-described method, a ceramic sintered body (hereinafter referred to as "laminate 12") is obtained.

Thereafter, the laminate 12 described above is barrel-polished as necessary. Thereafter, a conductive paste for the external electrode 22 is applied onto both end surfaces of the laminate 12 and baked to form a baking layer of the external electrode 22. As the baking condition at this time, the conductive paste is baked at a temperature of about 800° C., for example, in a nitrogen atmosphere.

Thereafter, on the surface of the baking layer, a Ni plating layer and a Sn plating layer are sequentially formed by, for example, a barrel plating method. Thus, the multilayer ceramic capacitor 10 is obtained.

The plating layer 26 may be formed directly on the surface of the laminate 12 without providing a baking layer.

Plating treatment is applied to the first end surface 12e and the second end surface 12f of the laminate 12 to form an underlying plating film on the exposure portion of the internal electrode layer 16. Although either electrolytic plating or electroless plating may be used as the plating treatment, when electroless plating is used, a pretreatment using a catalyst, for example, is required so as to increase a plating deposition rate. Thus, there is a disadvantage that the process becomes complicated. Accordingly, it is usually preferable to use electrolytic plating. As the plating method, barrel plating, for example, is preferably used.

The multilayer ceramic capacitor 10 was produced by the above-described method, and the ultrasonic flaw detection method and evaluation of a change in capacitance due to temperatures were performed as evaluation methods to confirm the presence or absence of structural defects. The structure of the underlying electrode was a baking layer, and a Ni plating layer and a Sn plating layer were formed as plating layers on the baking layer.

Various parameters of the multilayer ceramic capacitor 10 used in the experimental example are as follows.

Size L×W×T (design value, including external electrode): about 5.7 mm×about 5.0 mm×about 2.7 mm Mn/Zr at the interface between the internal electrode layer 16 and the dielectric layer 14 is as shown in Table 1.

The method of obtaining Mn/Zr is described below.

The value of Mn/Zr was controlled by adding a metallic powder to the internal electrode layer 16. Specifically, when the metallic powder, an organic vehicle, and a solvent were kneaded, the Mn resinate was simultaneously mixed in an amount of not less than about 0.01% and less than about 0.5%, for example, at the weight ratio of Mn in the Mn resinate to the weight of the metallic component. A paste obtained by mixing was dispersed by a three-roll mill or a ball mill to prepare an electrode paste having high smoothness and high uniformity of Mn. A capacitor was produced using this electrode paste in accordance with the method of manufacturing a multilayer ceramic capacitor described above, and confirmation was performed. In the Mn resinate, the weight ratio of Mn in the Mn resinate was controlled within the range of not less than about 0.01% and less than about 0.5%, for example, in each sample so that the values in Table 1 were obtained.

(The number of moles of Ca)/(the number of moles of Sr+the number of moles of Ba+the number of moles of Ca)=about 99%

(The number of moles of Ba)/(the number of moles of Sr+the number of moles of Ba+the number of moles of Ca)=about 0% (The number of moles of Sr)/(the number of moles of Sr+the number of moles of Ba+the number of moles of Ca)=about 1%

(The number of moles of Zr)/(the number of moles of Zr+the number of moles of Ti)=about 99%

(The number of moles of Ti)/(the number of moles of Zr+the number of moles of Ti)=about 1%

(The number of moles of Ca+the number of moles of Sr+the number of moles of Ba)/(the number of moles of Zr+the number of moles of Ti)=about 1

Capacitance: about 0.027 μF

Rated voltage: about 630 V

Internal electrode: Ni

Underlying electrode layer

Electrode containing Cu and glass

Thickness of underlying electrode layer (end surface central portion): about 30 μm Plating layer First plating layer (first layer): Ni: about 4 μm Second plating layer (first layer): Sn: about 2 μm Sample 1 was prepared without adding Mn resinate. Mn detected here is the value of Mn derived from the material.

TABLE 1

| | Mn/Zr at interface between dielectric layer and internal electrode layer Mn/Zr | Mn/Zr in dielectric layer of portion 20 nm inside from interface between internal electrode layer and dielectric layer toward dielectric layer Mn/Zr | Presence or absence of structural defects | Temperature characteristics (capacitance change rate) |
|---|---|---|---|---|
| Sample 1 | 0.05 | 0.003 | 30/100 | 1.4 ppm/° C. |
| Sample 2 | 0.073 | 0.006 | 13/100 | 2.6 ppm/° C. |
| Sample 3 | 0.115 | 0.007 | 2/100 | 4.6 ppm/° C. |
| Sample 4 | 0.117 | 0.009 | 0/100 | 4.9 ppm/° C. |
| Sample 5 | 0.138 | 0.01 | 0/100 | 10.3 ppm/° C. |
| Sample 6 | 0.151 | 0.013 | 0/100 | 15.5 ppm/° C. |
| Sample 7 | 0.187 | 0.015 | 0/100 | 23.5 ppm/° C. |
| Sample 8 | 0.19 | 0.017 | 0/100 | 25.7 ppm/° C. |
| Sample 9 | 0.246 | 0.018 | 0/100 | 27.0 ppm/° C. |
| Sample 10 | 0.272 | 0.02 | 0/100 | 27.1 ppm/° C. |
| Sample 11 | 0.276 | 0.025 | 0/100 | 28.7 ppm/° C. |
| Sample 12 | 0.28 | 0.026 | 0/100 | 28.9 ppm/° C. |
| Sample 13 | 0.281 | 0.027 | 0/100 | 29.0 ppm/° C. |
| Sample 14 | 0.296 | 0.03 | 0/100 | 31.0 ppm/° C. |
| Sample 15 | 0.297 | 0.031 | 0/100 | 31.7 ppm/° C. |
| Sample 16 | 0.325 | 0.037 | 0/100 | 35.0 ppm/° C. |
| Sample 17 | 0.338 | 0.039 | 0/100 | 36.2 ppm/° C. |

The position of about ½ of each of the L, W, and T dimensions, which was the central portion of the fired multilayer ceramic capacitor, was cut out, and the sample was sliced using FIB (focused ion beam) so that the interface between the internal electrode layer and the dielectric layer could be observed by FE-TEM. Thereafter, the interface was observed under the following equipment and conditions.

Equipment: JEM-2200FS manufactured by JEOL Ltd.
Mode: FE-TEM
Acceleration voltage: about 200 kV
Pretreatment: Pt coat
Equipment: system7 manufactured by Noran
Mode: EDX
Spot diameter: about 1 nm
Analysis time per point: about 5.0 sec
Integration time: 100 times
Method of checking perpendicularity of interface: it was confirmed by line analysis that the half-value width −3σ on average from about 5% of Zr average concentration in ceramic was not more than about 5 nm.
Field of view: 5 fields of view for each sample (excluding heterophasic parts)
Measurement point: 3 points for each field of view Multilayer ceramic capacitors are aligned on an LW plane and immersed in water. Thereafter, the presence or absence of defects present in the multilayer ceramic capacitor is confirmed using a phase difference of ultrasonic waves generated from an ultrasonic flaw detection device.

If defects such as peeling are present inside the multilayer ceramic capacitor, the time when the reflected wave of the generated ultrasonic wave returns is different, which is detected as the phase difference.

The ambient temperature of the multilayer ceramic capacitor is changed to an arbitrary temperature from about −55° C. to about 125° C., for example, and the capacitor capacitance (capacitance at about 1 V/1 kHz) at the temperature is measured. The capacitance change rate at each temperature was calculated, and the capacitance temperature characteristics of the multilayer ceramic capacitor were confirmed.

Based on the experimental results in Table 1, evaluation was able to be performed as follows.

For samples 1 to 3 in which Mn/Zr at the interface between the dielectric layer and the internal electrode layer is not more than about 0.115, two or more structural defects are present out of 100. On the other hand, for samples 4 to 17 in which Mn/Zr at the interface between the dielectric layer and the internal electrode layer is not more than about 0.117, the number of structural defects is 0 out of 100.

For samples 1 to 13 in which Mn/Zr is not more than about 0.027 in the dielectric layer of a portion about 20 nm inside from the interface between the internal electrode layer and the dielectric layer toward the dielectric layer, the capacitance change rate at the temperature of the temperature characteristics, that is, the dielectric characteristics is not more than about 30 ppm/° C. On the other hand, for samples 14 to 17 in which Mn/Zr is not less than about 0.03 in the dielectric layer of a portion about 20 nm inside from the interface between the internal electrode layer and the dielectric layer toward the dielectric layer, the capacitance change rate at the temperature of the temperature characteristics, that is, the dielectric characteristics is not less than about 31.0 ppm/° C. That is, when Mn/Zr is not less than about 0.03 in the dielectric layer of a portion about 20 nm inside from the interface between the internal electrode layer and the dielectric layer toward the dielectric layer, the temperature characteristics of COG (about 30 ppm/° C.) is not satisfied.

From the above results, according to preferred embodiments of the present invention, when Mn is present in a predetermined ratio relative to the main raw material of the dielectric material at the interface between the dielectric layer and the internal electrode layer, Mn whose valence may change is consequently disposed at the interface, and an oxygen ion is shared with internal electrode metal, so that strong interfacial bonding via the oxygen atom is able to be obtained between the dielectric layer as an oxide and the internal electrode layer as a metal. Thus, it is possible to secure an adhesion force between the dielectric layer and the internal electrode layer, and as a result, structural defects due to peeling occurring at the interface between the dielectric layer and the internal electrode layer are able to be reduced or prevented.

As described above, although the preferred embodiments of the present invention are disclosed in the above description, the present invention is not limited to this disclosure.

That is, various alterations may be made to the preferred embodiments described above in relation to mechanism, shape, material, quantity, and position or arrangement without departing from the technical ideas and the scope of objects, and those alterations are incorporated in the present invention.

For example, although the shape of the counter electrode portion 20a of the first internal electrode layer 16a and the second internal electrode layer 16b of the multilayer ceramic capacitor 10 is not particularly limited, the counter electrode portion 20a preferably has a rectangular or substantially rectangular shape. However, the corner portions may be rounded or obliquely structured (tapered).

Although the shapes of the extended electrode portions 18a and 18b of the first internal electrode layer 16a and the second internal electrode layer 16b are not particularly limited, the extended electrode portions 18a and 18b preferably each have a rectangular or substantially rectangular shape. However, the corner portions may be rounded or obliquely structured (tapered).

The width of the counter electrode portion 20a of the first internal electrode layer 16a and the second internal electrode layer 16b may be the same as the widths of the extended electrode portions 18a and 18b of the first internal electrode layer 16a and the second internal electrode layer 16b, or either one of them may be narrower.

Figure 4A:
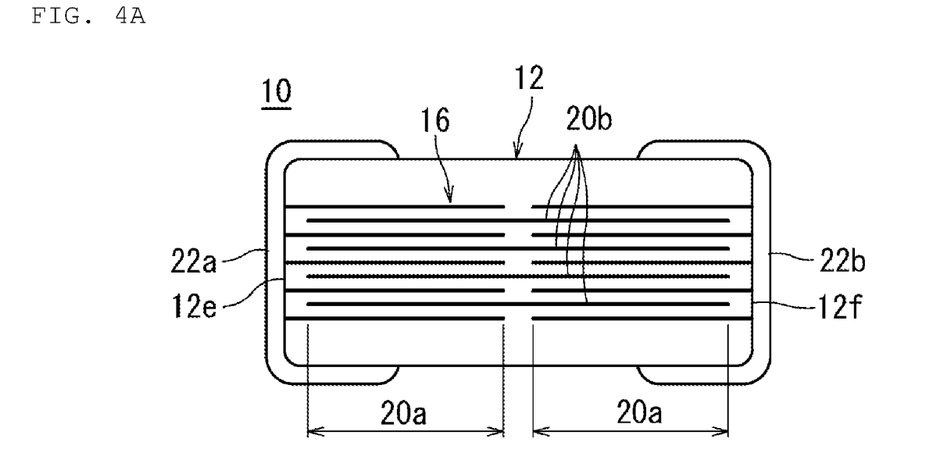
Figure 4B:
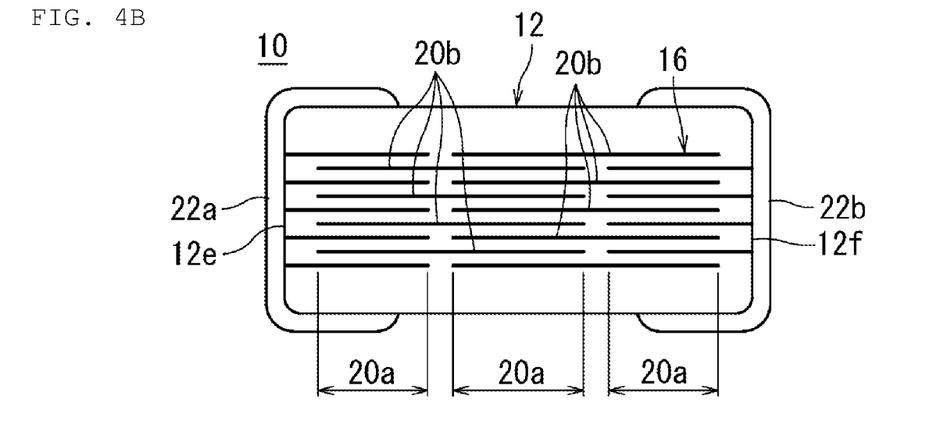
Figure 4C:
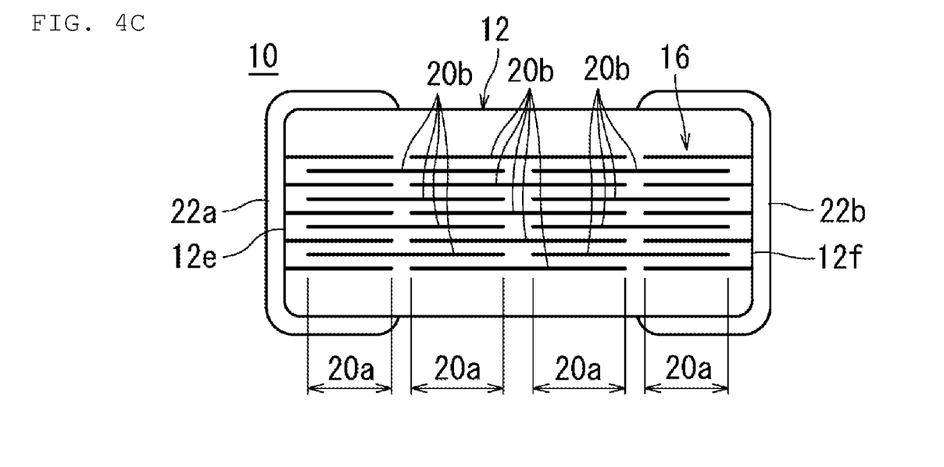

For example, as shown in FIGS. 4A to 4C, the internal electrode layer 16 may include a floating internal electrode layer 20b which is not led out to either the first end surface 12e or the second end surface 12f, and the counter electrode portion 20a may be divided into a plurality of portions by the floating internal electrode layer 20b. For example, two series of structures of FIG. 4A, three series of structures of FIG. 4B, four series of structures of FIG. 4C or four or more series of structures (not shown) may be adopted. When the counter electrode portion 20a is thus divided into a plurality of portions, a plurality of capacitor components are provided between the internal electrode layers 16 facing each other, and the capacitor components are connected in series. Thus, a voltage applied to each capacitor component is reduced, and withstanding voltage of the multilayer ceramic capacitor 10 is able to be increased.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A multilayer ceramic capacitor comprising:
    a laminate including a first main surface and a second main surface facing each other in a stacking direction, a first side surface and a second side surface facing each other in a width direction orthogonal or substantially orthogonal to the stacking direction, and a first end surface and a second end surface facing each other in a length direction orthogonal or substantially orthogonal to the stacking direction and the width direction; and
    an external electrode disposed on one of the first and second end surfaces; wherein
    the laminate includes a plurality of dielectric layers and a plurality of internal electrode layers that are alternately laminated;
    the plurality of dielectric layers include a perovskite compound, the perovskite compound including Ca and Zr;
    Mn is disposed at an interface between one of the plurality of dielectric layers and one of the plurality of internal electrode layers; and
    a Mn/Zr molar ratio is not less than about 0.117 at the interface.

2. The multilayer ceramic capacitor according to claim 1, wherein the Mn/Zr molar ratio is not more than about 0.027 in the plurality of dielectric layers of a portion about 20 nm inside from the interface.

3. The multilayer ceramic capacitor according to claim 1, wherein the plurality of internal electrode layers include Ni or Cu.

4. The multilayer ceramic capacitor according to claim 1, wherein the plurality of dielectric layers mainly include $CaZrO_3$.

5. The multilayer ceramic capacitor according to claim 1, wherein the perovskite compound further includes Sr and Ti.

6. The multilayer ceramic capacitor according to claim 1, wherein the plurality of dielectric layer mainly include $CaTiO_3$, $SrTiO_3$, or $BaZrO_3$.

7. The multilayer ceramic capacitor according to claim 1, wherein a thickness of each of the plurality of dielectric layers is not less than about 0.5 μm and not more than about 30 μm.

8. The multilayer ceramic capacitor according to claim 1, wherein a number of the plurality of dielectric layers is not less than about 10 and not more than about 400.

9. The multilayer ceramic capacitor according to claim 1, wherein a dimension of the laminate in the stacking direction is not less than about 200 μm and not more than about 2700 μm.

10. The multilayer ceramic capacitor according to claim 1, wherein
    the laminate includes an outer layer portion and an inner layer portion;
    the outer layer portion is located on a side of one of the first main surface and the second main surface; and
    the outer layer portion is located between the one of the first main surface and the second main surface and one of the plurality of internal electrode layers closest to the one of the first main surface and the second main surface.

11. The multilayer ceramic capacitor according to claim 10, wherein a thickness the outer layer portion in the stacking direction is not less than about 5% and not more than about 45% of a thickness of the laminate in the stacking direction.

12. The multilayer ceramic capacitor according to claim 1, wherein a dimension of the laminate in the length direction is not less than about 0.2 mm and not more than about 32 mm, a dimension of the laminate in the width direction is not less than about 0.1 mm and not more than about 32 mm, and a dimension of the laminate in the stacking direction is not less than about 0.1 mm and not more than about 5 mm.

13. The multilayer ceramic capacitor according to claim 1, wherein a dimension of each of the plurality of internal electrode layers in the stacking direction is not less than about 0.5 μm and not more than about 2.0 μm.

14. The multilayer ceramic capacitor according to claim 1, wherein the external electrode covers the one of the first and second end surfaces and extends to a portion of the first and second main surfaces and a portion of the first and second side surfaces.

15. The multilayer ceramic capacitor according to claim 1, wherein the external electrode includes an underlying electrode layer disposed on the one of the first and second end surfaces, and a plating layer disposed on the underlying layer.

16. The multilayer ceramic capacitor according to claim 15, wherein the underlying electrode layer includes glass and metal.

17. The multilayer ceramic capacitor according to claim 16, wherein the glass includes at least one of B, Si, Ba, Mg, Al, or Li.

18. The multilayer ceramic capacitor according to claim 16, wherein the metal includes at least one of Cu, Ni, Ag, Pd, Ag—Pd alloy, or Au.

19. The multilayer ceramic capacitor according to claim 15, wherein a thickness of a thickest portion of the underlying electrode is not less than about 10 μm and not more than about 50 μm.

20. The multilayer ceramic capacitor according to claim 15, wherein the plating layer includes a Ni plating layer and a Sn plating layer.

* * * * *